R. CHASSE.
RAT TRAP.
APPLICATION FILED SEPT. 9, 1918.
1,330,683.
Patented Feb. 10, 1920.
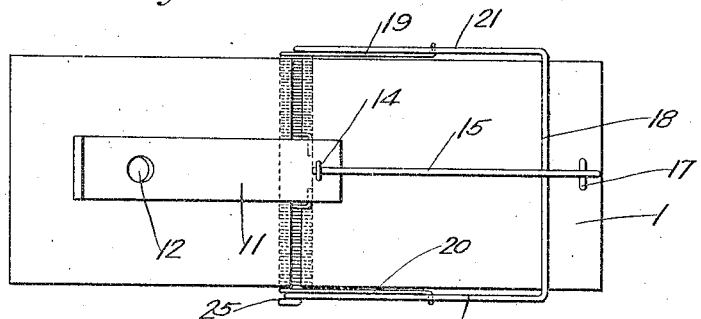
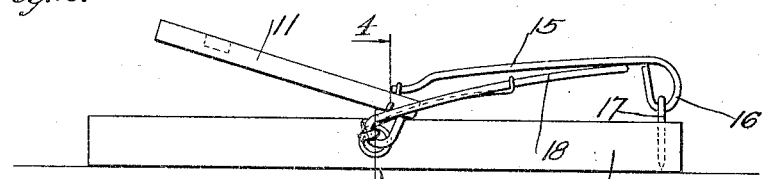
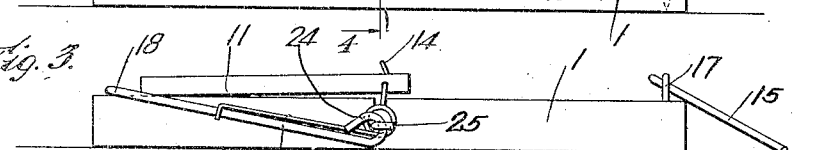
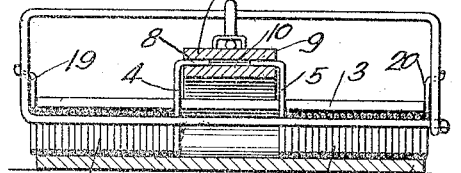
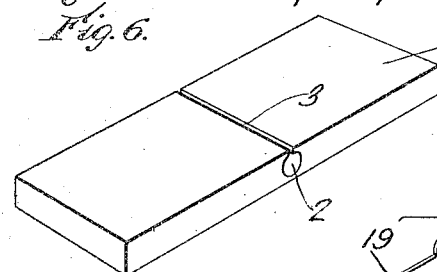
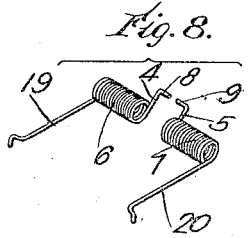
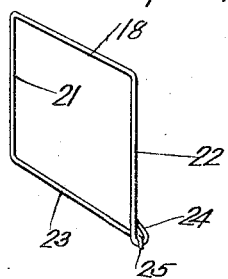
WITNESSES
INVENTOR
Raphael Chasse,
BY
ATTORNEYS

UNITED STATES PATENT OFFICE.

RAPHAEL CHASSE, OF MIDDLETOWN, NEW YORK.

RAT-TRAP.

1,330,683. Specification of Letters Patent. Patented Feb. 10, 1920.

Application filed September 9, 1918. Serial No. 253,299.

*To all whom it may concern:*

Be it known that I, RAPHAEL CHASSE, a citizen of the United States, and a resident of Middletown, in the county of Orange and State of New York, have invented a new and Improved Rat-Trap, of which the following is a full, clear, and exact description.

This invention relates to animal traps and particularly to what is commonly known as rat traps, which may be used for catching rats, mice and rodents of different kinds without departing from the spirit of the invention, the object being to form a simple spring construction which will be easily set and which is of positive operation.

Another object in view is to provide a trap in which the striking member and the springs actuating therewith may be bodily removed quickly and easily when disassembling the trap.

A further object of the invention is to provide a trap with a base and attachments connectible thereto for completing the traps which are simple in construction and easy to set and reset during the use of the device.

In the accompanying drawing:

Figure 1 is a top plan view of a trap in a set position.

Fig. 2 is an edge view of the structure shown in Fig. 1.

Fig. 3 is an edge view of the trap after the same has been released or sprung.

Fig. 4 is a transverse sectional view through Fig. 2 on line 4—4, same being on a slightly enlarged scale.

Fig. 5 is a sectional view similar to Fig. 4, but showing a slightly modified form of the invention.

Fig. 6 is a perspective view of the base shown in Fig. 1 disclosing certain features of the invention.

Fig. 7 is a perspective view of the spring shown in Fig. 1 disclosing certain features of the invention.

Fig. 8 is a perspective view of the catcher or holder shown in Fig. 1.

Referring to the accompanying drawing by numerals, 1 indicates the base of the trap, said base being formed of any desired material, as for instance wood, and provided with a bore 2 extending from one edge to the other, said bore merging into a slot 3 through which the ends 4 and 5 of springs 6 and 7 project. The ends 4 and 5 are bent from sections 8 and 9 contacting into the aperture 10 of the trigger 11 and act as movable pintles for said catch, which when the trap is properly set is positioned so that one end of the trigger rests on the base 1 as shown in Fig. 2, while the other end is in the air. A suitable depression 12 is provided in the free end of the trigger 11 whereby when a rodent or any animal steps on the trigger in order to secure the bait in recess 12 said trigger will be moved downwardly and will thereby move the staple or maintaining member 14 from off the releasing arm 15, which arm has one end extending through the staple 14 while the opposite end is looped at 16 so as to be loosely journaled in the staple 17. As soon as the trigger 11 has been depressed the releasing arm 15 will be disconnected and consequently the hammer or catcher 18 will quickly move over from the position shown in Fig. 2 to the position shown in Fig. 3 and strike the animal a blow. In order to cause the hammer or catcher 18 to act in this manner springs 6 and 7 are provided with arms or extensions 19 and 20 bent at their outer ends so as to overlap the sides 21 and 22 of the hammer 18 and thereby urge the hammer to the position shown in Fig. 3. Hammer 18 is provided with a transverse member 23 extending through the springs 6 and 7 as shown in Fig. 4 and by reason of the loops 24 and 25 is interlocked with the side 22 and thereby held permanently in position ready for a proper movement when the device is being set or for movement under the action of springs 6 and 7. It will be noted that the springs will not only move the hammer over quickly so as to strike the animal, but will hold the spring in the position shown in Fig. 3 and thereby retain the animal.

The slot 3 is made sufficiently wide to allow a limited swinging movement of the arms 4 and 5 in order that when an animal steps on the trigger 11 said trigger will be moved until the staple 14 is disengaged from the releasing arm 15.

In Fig. 5 will be seen a slightly modified form of the invention in which the hammer 26 is provided with ends 27 and 28 extending for part of the length of the springs 6' and 7'. Spring 6' is provided with an arm 4' which arm is in turn provided with a transverse pintle member or extension 29 extending entirely through the aperture 10 and the trigger 11. Arm 5' is preferably straight and rests against the end of the pintle member or extension 29 so both springs will act on the trigger 11 and also through the arms 19 and 20 on the hammer 26, as in the preferred form of the invention. In forming the structure shown in Fig. 5 the hammer 26 is preferably made from some resilient metal which will allow one of the members 27 or 28 to be sprung into position.

What I claim is:

1. A trap for rodents comprising a base having a transversely positioned aperture merging into a slot, a pair of springs arranged in said aperture, each of said springs having an arm at each end, one of the adjacent arms of said springs having a turned over end, a trigger having an aperture for accommodating said turned over end, the other of said arms being looped over said turned over end, a hammer having end sections loosely journaled in said springs, said hammer being actuated by one end of each of said springs, and a releasing arm engaging said trigger and the hammer when the trap is set.

2. A trap for rodents comprising a base having a transversely positioned aperture merging into a slot extending into one face of the base, a pair of coil springs arranged in said aperture each of said springs having an arm at each end, a trigger pivotally connected with one of the adjacent arms and held in position thereby, said adjacent arms being pivotally connected together, a hammer having inwardly extending ends loosely positioned in said springs, said ends extending over the sides of said base, the ends of said springs opposite those adjacent the trigger acting on said hammer to move the hammer to an operated position, and a releasing arm engaging said trigger and said hammer when the trap is set.

3. A trap for rodents comprising a wood base having a transversely positioned aperture extending entirely therethrough and merging into a slot extending into one face of the base, a pair of coiled springs arranged in said aperture, each of said springs having an arm at each end, one of said arms having an offset extending parallel with the axis of the spring, a wood trigger having an aperture into which said offset extends, a substantially U-shaped hammer having inwardly extending ends loosely positioned in said spring, the ends of the springs opposite those adjacent the trigger acting on the hammer to move the same to an operated position, a releasing arm for holding said hammer in a set position, and means for engaging said releasing arm with the trigger.

4. A trap for rodents comprising a wood base having a transversely positioned aperture extending entirely therethrough and merging into a slot extending to one face of the base, a pair of coiled springs arranged in said aperture each of said springs having an arm at each end, adjacent arms extending through said slot, said slot being sufficiently wide to allow a limited movement of the arms, a wood trigger connected with said arms so as to be held in place thereby and use the arms as a pivotal support therefor, a substantially U-shaped hammer, the ends of the springs opposite those adjacent the trigger acting on the hammer to move the same to an operated position, a releasing arm for holding said hammer in a set position, and means for engaging said releasing arm with the trigger.

RAPHAEL CHASSE.